United States Patent
Misso

[11] Patent Number: 6,121,742
[45] Date of Patent: Sep. 19, 2000

[54] CONTROL SCHEME FOR MULTI-ACTUATOR DISC DRIVE

[75] Inventor: Nigel F. Misso, Bethany, Okla.

[73] Assignee: Seagate Technology LLC, Scotts Valley, Calif.

[21] Appl. No.: 09/273,005

[22] Filed: Mar. 19, 1999

Related U.S. Application Data

[60] Provisional application No. 60/078,798, Mar. 20, 1998.

[51] Int. Cl.$^7$ .................................................. G11B 5/54
[52] U.S. Cl. .......................... 318/562; 360/75; 369/44.35
[58] Field of Search ...................................... 318/562, 625; 360/75, 77.01, 77.02, 77.05, 78.04–78.14; 369/43, 44.11, 44.25, 44.35, 44.36

[56] References Cited

U.S. PATENT DOCUMENTS

| | | | |
|---|---|---|---|
| 4,423,448 | 12/1983 | Frandsen | 360/106 |
| 4,589,036 | 5/1986 | Bertschy et al. | 360/69 |
| 4,707,754 | 11/1987 | Patel et al. | 360/106 |
| 4,812,935 | 3/1989 | Sleger | 360/106 |
| 4,851,939 | 7/1989 | Seo et al. | 360/77.02 |
| 4,994,931 | 2/1991 | Foote | 360/106 |
| 5,016,131 | 5/1991 | Riggle et al. | 360/106 |
| 5,016,160 | 5/1991 | Lambeth et al. | 364/200 |
| 5,218,496 | 6/1993 | Kaczeus | 360/106 |
| 5,223,993 | 6/1993 | Squires et al. | 360/77.08 |
| 5,267,110 | 11/1993 | Ottesen et al. | 360/106 |
| 5,293,282 | 3/1994 | Squires et al. | 360/77.08 |
| 5,343,345 | 8/1994 | Gilovich | 360/104 |
| 5,805,386 | 9/1998 | Faris | 360/106 |

*Primary Examiner*—Bentsu Ro
*Attorney, Agent, or Firm*—Westman, Champlin & Kelly, P.A.

[57] ABSTRACT

In a computer disc drive system having a plurality of voice coil motors for independently actuating a plurality of actuator arms or E-blocks, a single voice coil motor servo control circuit controls the plurality of voice coil motors. In a preferred embodiment, a single digital servo processor dynamically allocates servo bandwidth to the plurality of voice coil motors according to the present activity of each voice coil motor. In a preferred embodiment, the single digital servo processor allocates the greatest amount of bandwidth to a voice coil motor that is presently positioning an associated read/write head for writing, a lesser amount of bandwidth to a voice coil motor that is presently positioning a read/write head for reading, and the least amount of bandwidth to a voice coil motor that is presently seeking or idle.

16 Claims, 5 Drawing Sheets

CONTROL SCHEME FOR MULTI-ACTUATOR DISC DRIVE

CROSS-REFERENCE TO CO-PENDING APPLICATION

This application claims the benefit of U.S. Provisional Patent Application No. 60/078,798, entitled "CONTROL SCHEME FOR MULTI-ACTUATOR DISC DRIVE," filed on Mar. 20, 1998.

BACKGROUND OF THE INVENTION

The present invention relates to disc drive data storage systems. More particularly, the present invention relates to multi-actuator disc drives.

Disc drive data storage systems use rigid discs which are coated with a magnetizable medium for storage of digital information in a plurality of circular, concentric data tracks. The discs are mounted in a stack on the hub structure of a "brushless" direct current spindle motor which causes the discs to spin and the surfaces of the discs to pass under respective hydrodynamic (e.g. air) bearing disc head sliders. The sliders carry transducers which write information to and read information from the disc surfaces. Each slider is supported by an actuator arm and a suspension. Each actuator arm is supported by a common actuator body, which is often referred to as an "E-block". The E-block supports each actuator arm and its suspension relative to a respective one of the disc surfaces. An electromechanical actuator, such as a rotary moving coil actuator or "voice coil motor," operates within a negative feedback, closed-loop servo system to rotate the E-block and thus move the actuator arms together radially over the disc surfaces for track seek operations and hold the read/write heads directly over a track or common cylinder on the disc surfaces for track following operations. Conventional disc drives have only one read/write channel and therefor can only read or write with one head at a time.

Disc drives having multiple voice coil motors for independently rotating multiple E-blocks are known in the art. Such disc drives allow one or more voice coil motors to position their read/write heads at other tracks while another read/write head is reading or writing. Also, in a system which employs multiple read/write channels, two or more independent read/write heads can simultaneously read or write at different radial positions of the disc stack. One drawback of these existing multiple actuator systems is that they use a totally independent servo loop to control each voice coil motor. Furthermore, existing systems require one set of state machines and look-up tables for each voice coil motor in order to control the independent voice coil motors. Thus, the requirement in existing systems of multiple voice coil motor controllers and multiple sets of memory for the state machines and look-up tables results in increased cost, increased weight, increased volume and increased complexity.

The present invention addresses these and other problems, and offers other advantages over the prior art.

SUMMARY OF THE INVENTION

One embodiment of the present invention is directed to an actuator assembly including a plurality of actuator arms, a plurality of read/write heads, a plurality of voice coil motors and a single voice coil motor servo control circuit. Each of the actuator arms are rotatable about a pivot axis independently from another one of the actuator arms. The read/write heads are each mounted at a distal end of one of the actuator arms so as to be proximate a surface of a magnetic disc. Each of the voice coil motors are coupled to at least one of the actuator arms and adapted to controllably rotate its associated actuator arm (or arms) about the pivot axis. The single voice coil motor servo control circuit is adapted to control the plurality of voice coil motors.

In a preferred embodiment, the voice coil motor servo control circuit comprises a single digital servo processor that dynamically allocates servo bandwidth to the plurality of voice coil motors according to the present activity of each voice coil motor.

Another embodiment of the present invention is directed to a disc drive including a spindle, at least one magnetic disc, a spindle motor, a plurality of actuator arms, a plurality of read/write heads, a plurality of voice coil motors and a single voice coil motor servo control circuit. The magnetic disc(s) are adapted to store data and are rotatable about the spindle. The spindle motor is adapted to rotate the magnetic disc(s). Each of the actuator arms are rotatable about a pivot axis independently from another one of the actuator arms. The read/write heads are each mounted at a distal end of one of the actuator arms so as to be proximate a surface of a magnetic disc. Each of the voice coil motors are coupled to at least one of the actuator arms and adapted to controllably rotate its associated actuator arm (or arms) about the pivot axis. The single voice coil motor servo control circuit is adapted to control the plurality of voice coil motors.

Still another embodiment of the present invention is directed to a disc drive including a plurality of voice coil motors, each coupled to at least one actuator arm and each adapted to controllably rotate its associated actuator arm(s), and a single digital servo processor that dynamically allocates servo bandwidth to the plurality of voice coil motors according to the present activity of each voice coil motor.

These and various other features as well as advantages which characterize the present invention will be apparent upon reading of the following detailed description and review of the associated drawings.

DETAILED DESCRIPTION OF THE PREFERRED EMBODIMENTS

Figure 1:
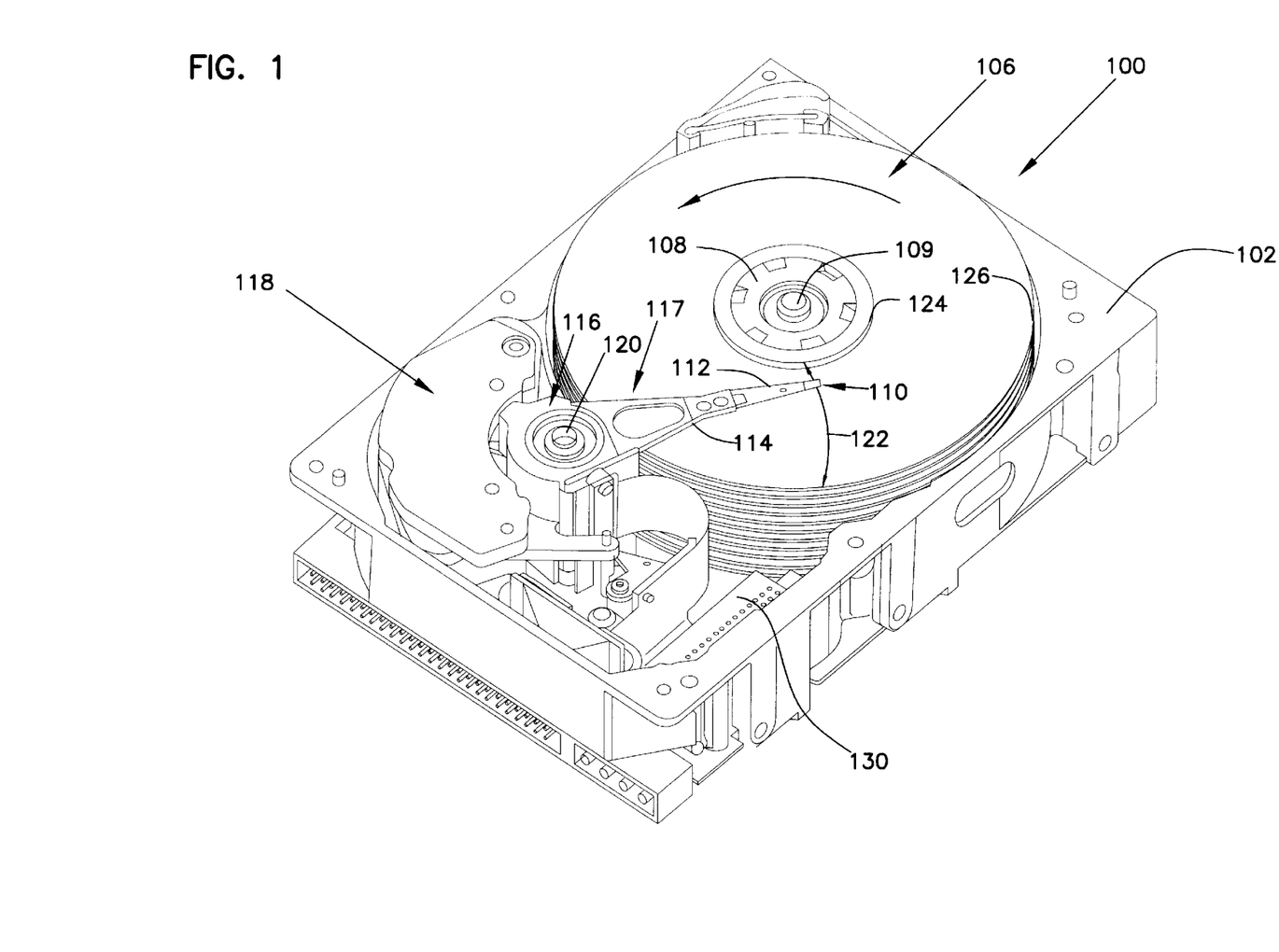
FIG. 1 is a perspective view of a disc drive according to one embodiment of the present invention.

FIG. 1 is a perspective view of a disc drive 100 according to one embodiment of the present invention. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about spindle 109. Each disc surface has an associated read/write head 110 which is mounted to disc drive 100 for communication with the disc surface. In the example shown in FIG. 1, read/write heads 110 are supported by suspensions 112 which are in turn attached to actuator arms 114 of an actuator assembly 116.

Actuator assembly 116 is of the type known as a rotary moving coil actuator and includes multiple E-blocks, shown generally at 117, and multiple voice coil motors (VCMs), shown generally at 118. As discussed in more detail below with reference to FIG. 2, each of the E-blocks 117 support a respective set of actuator arms 114. Each voice coil motor 118 rotates a respective E-block 117 with its respective actuator arms 114 and read/write heads 110 about a pivot shaft 120. Rotation of track accessing arms 114 about pivot shaft 120 moves read/write heads 110 along an arcuate path 122, between a disc inner diameter 124 and a disc outer diameter 126.

Figure 2:
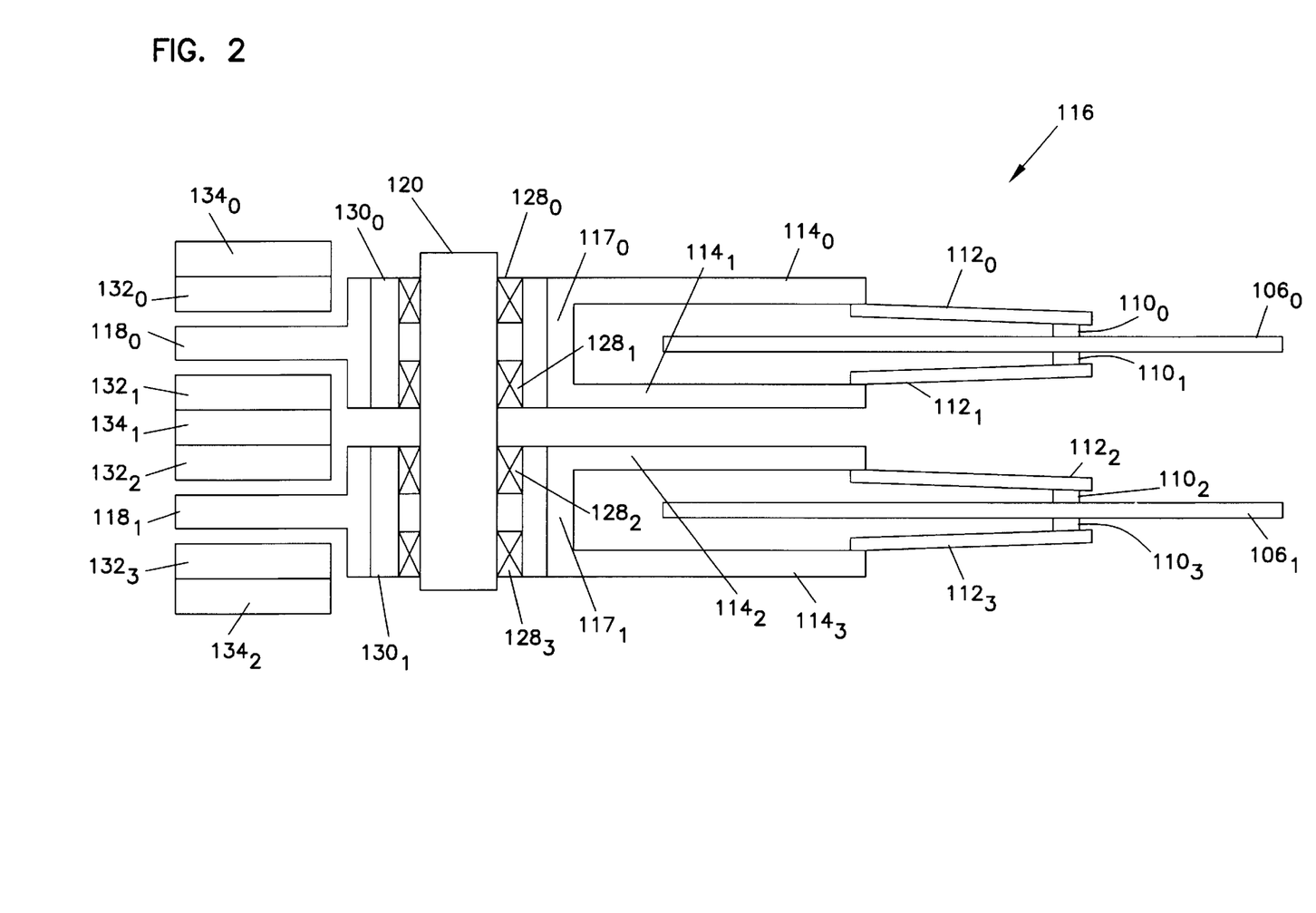
FIG. 2 is an elevation cross-sectional view of an actuator assembly according to an illustrative embodiment of the invention.

Referring now to FIG. 2, actuator assembly 116 according to an illustrative embodiment of the invention will now be described. For simplicity, actuator assembly 116 is shown with two voice coil motors $118^0$ and $118^1$ and associated E-blocks $117^0$ and $117^1$, and four track actuator arms $114^0$–$114^3$ and associated read/write heads $110^0$–$110^3$. However, it should be understood that the present invention is applicable to any plural number of voice coil motors 118, E-blocks 117, actuator arms 114 and read/write heads 110. Actuator arms $114^0$–$114^3$ each have an associated suspension $112^0$–$112^3$ attached at its distal end, with an associated read/write head $110^0$–$110^3$ mounted at the distal end of the suspension $112^0$–$112^3$. Actuator arms $114^0$, $114^1$ are joined together into E-block $117^0$, while actuator arms $114^2$, $114^3$ are joined together into E-block $117^1$. As such, actuator arms $114^0$, $114^1$, and their associated suspensions $112^0$, $112^1$ and read/write heads $110^0$, $110^1$, are positioned at the same track, or radial position, of disc $106^0$ at all times. Similarly, actuator arms $114^2$, $114^3$, associated suspensions $112^2$, $112^3$, and read/write heads $110^2$, $110^3$, are positioned at the same track, or radial position, of disc $106^1$.

E-blocks $117^0$, $117^1$, each rotate about common pivot shaft 120, by way of associated cartridge bearings $128^0$–$128^3$. E-blocks $117^0$, $117^1$ are attached to voice coil motors $118^0$, $118^1$, respectively, by way of cartridge sleeves $130^0$, $130^1$ so that actuator arm pairs $114^0$, $114^1$, and $114^2$, $114^3$ may be separately positioned relative to one another. Each of voice coil motors $118^0$, $118^1$ are constructed in the conventional manner, as a coil of conducting wire supported by a yoke, and are interleaved between magnets $132^0$–$132^3$ and associated poles $134^0$–$134^2$. Preferably, pole $134^0$ is disposed on the top of magnet $132^0$, which is positioned above voice coil motor $118^0$. Pole $134^1$ is preferably disposed between magnets $132^1$ and $132^2$, which in turn are positioned between voice coil motors $118^0$ and $118^1$. Pole $134^2$ is preferably disposed beneath magnet $132^3$, which is positioned below voice coil motor $118^1$. In this manner, voice coil motors $118^0$, $118^1$ may be operated independently from one another, to provide separate radial positioning of their respective read/write heads $110^0$–$110^3$ relative to discs $106^0$, $106^1$.

Figure 3:
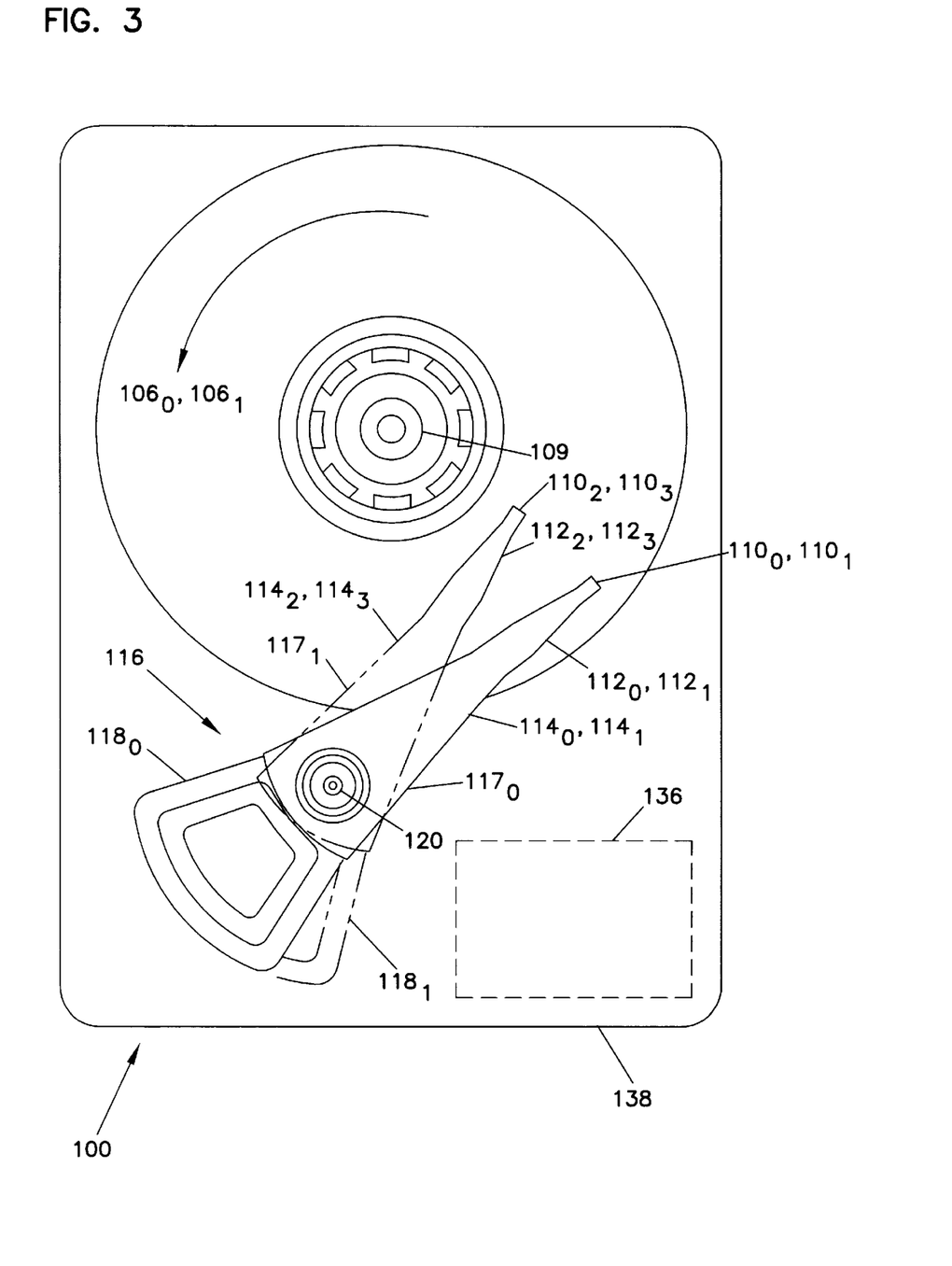
FIG. 3 is a schematic plan view of a voice coil motor in a disc drive system according to an illustrative embodiment of the invention.

FIG. 3 schematically illustrates, in plan view, disc drive 100 with actuator assembly 116 having actuator arms $114^0$, $114^1$ in a different radial position than actuator arms $114^2$, $114^3$ according to this illustrative embodiment of the invention. Disc drive 100 includes case 138, with discs $106^0$, $106^1$ (only the top surface of upper disc $106^0$ visible in FIG. 3) rotating about spindle 109. Separate voice coil motors $118^0$ and $118^1$ are operable to separately and independently position E-blocks $117^0$ and $117^1$, and thus their corresponding actuator arms $114^0$, $114^1$ and $114^2$, $114^3$ and read/write heads $110^0$, $110^1$ and $110^2$, $110^3$ at desired radial positions or tracks of discs $106^0$, $106^1$. Magnets $132^0$–$132^3$ and poles $134^0$–$134^3$ are not shown in FIG. 3, for purposes of clarity, but are of course present in disc drive 100. In FIG. 3, actuator arms $114^2$, $114^3$ their associated flexures $112^2$, $112^3$, and read/write head $110^2$, $110^3$, are illustrated in shadow as they are located below disc 80. Actuator arms $114^1$, $114^3$, and their associated flexures $112^1$, $112^3$, and read/write heads $110^1$, $110^3$, are hidden by actuator arms $114^0$, $114^2$, respectively, and their associated components. Drive electronics 136 are contained within case 138. Actuator assembly 116, constructed as described hereinabove relative to FIG. 2, is disposed within approximately the same area as the conventional actuator assembly, as the distance of travel of the associated voice coil motors and actuator arms are similar.

Figure 4:
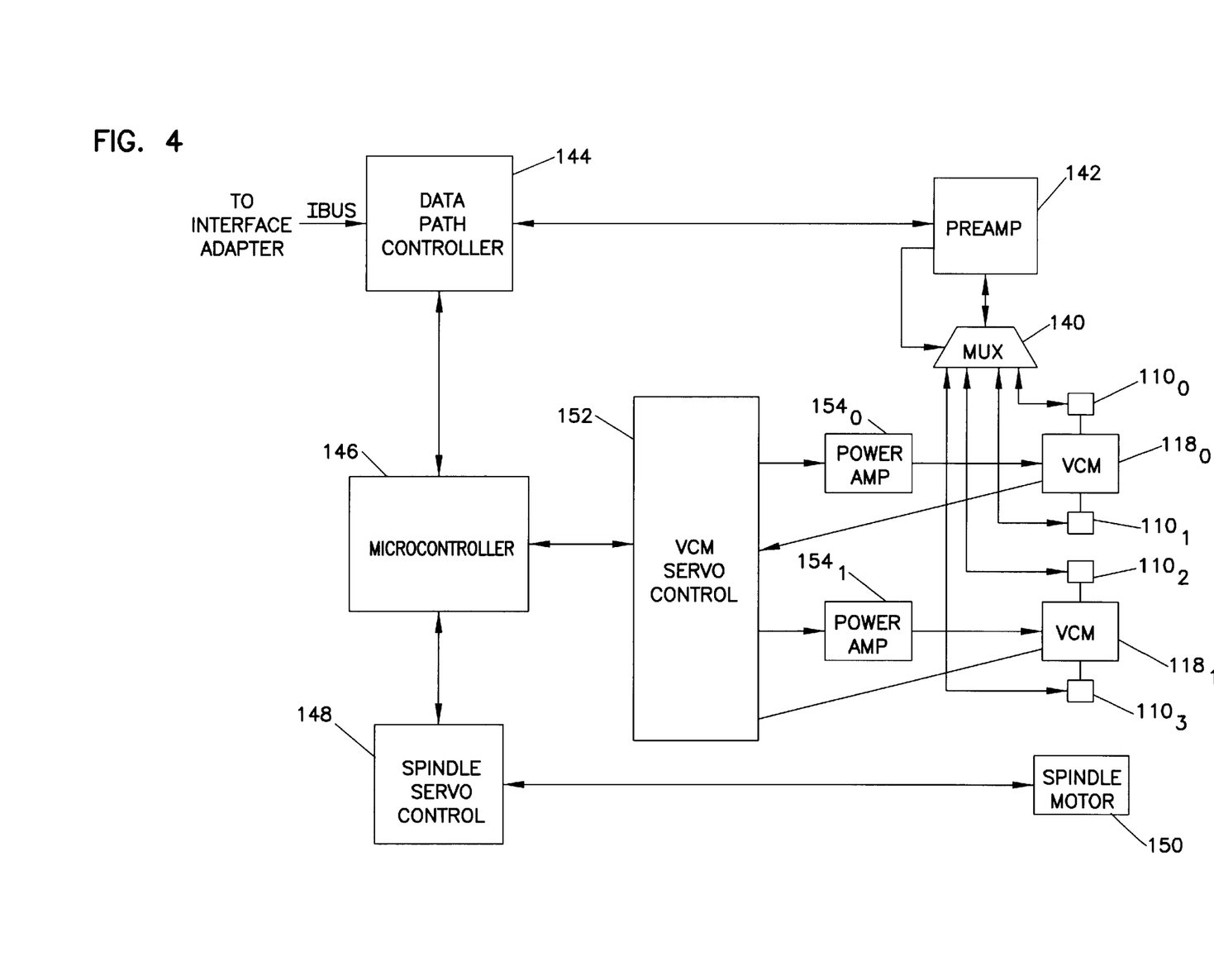
FIG. 4 is an electrical diagram, in block form, of data communications and drive control circuitry for a disc drive system according to a preferred embodiment of the invention.

Referring to FIG. 4, an example of the drive electronics for actuator assembly 116 according to an illustrative embodiment of the invention will now be described. In this illustrative embodiment of the invention, heads $110^0$–$110^3$ are operated in the conventional manner, where only one of heads $110^0$–$110^3$ is active at any one time. As will be discussed below, the present invention is also applicable to disc drives having more than one read/write channel, thus allowing reading and/or writing to multiple heads simultaneously.

In this illustrative embodiment, the data path electronics for actuator assembly 116 are constructed in the conventional manner, with multiplexer 140 in communication with each of heads $110^0$–$110^3$ and with preamp 142. Preamp 142 communicates data between the selected head 110 and data path controller 144, which in turn is in communication with an interface adapter over interface bus IBUS. Interface bus IBUS is an internal computer system bus for communication to peripherals such as disc drive controllers and is preferably arranged and operated according to a conventional disc drive standard, such as IDE (Integrated Development Environment) or SCSI (Small Computer System Interface), or the like. The interface adapter is connected to the system bus, for communication of data between system bus elements, such as the CPU and main memory, and disc drive system 100 in a conventional manner.

According to this illustrative embodiment of the invention, microcontroller 146 is coupled to data path controller 144, to receive track and spindle control signals therefrom. Data path controller 144 includes conventional disc drive read/write channel circuitry. Microcontroller 146 is connected to an output bus of data path controller 144, to receive track and spindle control signals from the operating system of the computer, via interface bus IBUS. Microcontroller 146 forwards the appropriate spindle drive signals to spindle servo control 148 for control of spindle motor 150 in the conventional manner.

According to this illustrative embodiment of the invention, microcontroller 146 also forwards track selection signals to VCM servo control 152. The track selection signals indicate the tracks (i.e., the radial positions of discs $106^0$, $106^1$) at which the various heads $110^0$–$110^3$ are to be positioned to accomplish the desired read or write operation. VCM servo control 152 uses the track selection data to provide each power amplifier $154^0$ and $154^1$ with a signal indicative of the magnitude, polarity and duration of the drive current required by each of the voice coil motors $118^0$ and $118^1$ to achieve the desired position of the read/write heads $110^0$–$110^3$. The power amps $154^0$, $154^1$ then provide the appropriate drive current to each voice coil motor $118^0$, $118^1$.

According to this illustrative embodiment of the invention, actuator assembly 116 operates in the conventional manner, with one of read/write heads $110^0$–$110^3$ being selected at any one time through operation of multiplexer 140. The incorporation of multiple voice coil motors $118^0$, $118^1$, along with multiple E-blocks $117^0$, $117^1$ allows for improvement in disc access time, however, as one of E-blocks $117^0$, $117^1$, may be positioning itself during such time as a read or write access is being performed by one of heads $110^0$–$110^3$ on the other one of E-blocks $117^0$, $117^1$.

In a preferred embodiment, VCM servo control circuit 152 is implemented with a digital servo processor that dynamically allocates bandwidth to the voice coil motors $118^0$, $118^1$ according to the present activity of each voice coil motor $118^0$, $118^1$. The bandwidth required to control each voice coil motor $118^0$, $118^1$ varies according to whether it is positioning its associated E-block 117 for writing, reading, seeking or otherwise (idle, e.g.). Writing requires the most resolution and therefor the most bandwidth because the head position must be tightly controlled over the desired track to prevent over-writing adjacent tracks and corrupting data on the adjacent tracks. Reading requires less resolution and less bandwidth because finely written data can be recovered over a much wider area than it was written. Positioning a seeking or idle E-block $117^0$, $117^1$ requires very little resolution and bandwidth.

The present invention capitalizes on the above operating characteristics of disc drive systems by dynamically allocating servo bandwidth to each voice coil motor $118^0$, $118^1$ according to its present activity. Thus, in a preferred embodiment, the digital servo processor allocates a predetermined amount of servo bandwidth to a voice coil motor $118^0$, $118^1$ that is presently positioning a read/write head $110^0$–$110^3$ for writing. The digital servo processor allocates a lesser predetermined amount of servo bandwidth to a voice coil motor $118^0$, $118^1$ that is presently positioning a read/write head $110^0$–$110^3$ for reading. The digital servo processor allocates the least predetermined amount of servo bandwidth to a voice coil motor $118^0$, $118^1$ that is presently seeking or idle.

For example, in the illustrative system referred to above with respect to FIG.'s 2–4, having one read/write channel and two voice coil motors $118^0$, $118^1$, a digital servo processor according to the present invention might allocate 1200 hertz (Hz) of bandwidth for writing, 800 Hz for reading and 400 Hz for seeking or idle. Because there is only one read/write channel, the system can only read or write with one head $110^0$–$110^3$ at a time. Thus, the maximum total bandwidth required by such a digital servo processor would occur when one of the voice coil motors $118^0$, $118^1$ is positioning a head $110^0$–$110^3$ for writing, in which case the other voice coil motor 118 must necessarily be either seeking or idle. Therefor the maximum total bandwidth required of the digital servo processor would be 1200 Hz+400 Hz=1600 Hz. In general, the total bandwidth required of a digital servo processor in such a system would be equal to the sum of the bandwidth allocated for writing and the bandwidth allocated for seeking or idle. In contrast, such a system implemented with the conventional method of using one servo controller for each voice coil motor would require two digital servo processors of 1200 Hz bandwidth each, since each servo processor would need to be able to control its associated voice coil motor for writing. Furthermore, each of the servo processors would require a separate set of the look-up tables and state machines needed to effect servo control, whereas the single digital servo processor of the present invention requires only one set of look-up tables and state machines. The bandwidth numbers used in the above example are purely arbitrary and are used for illustrative purposes only.

Figure 5:
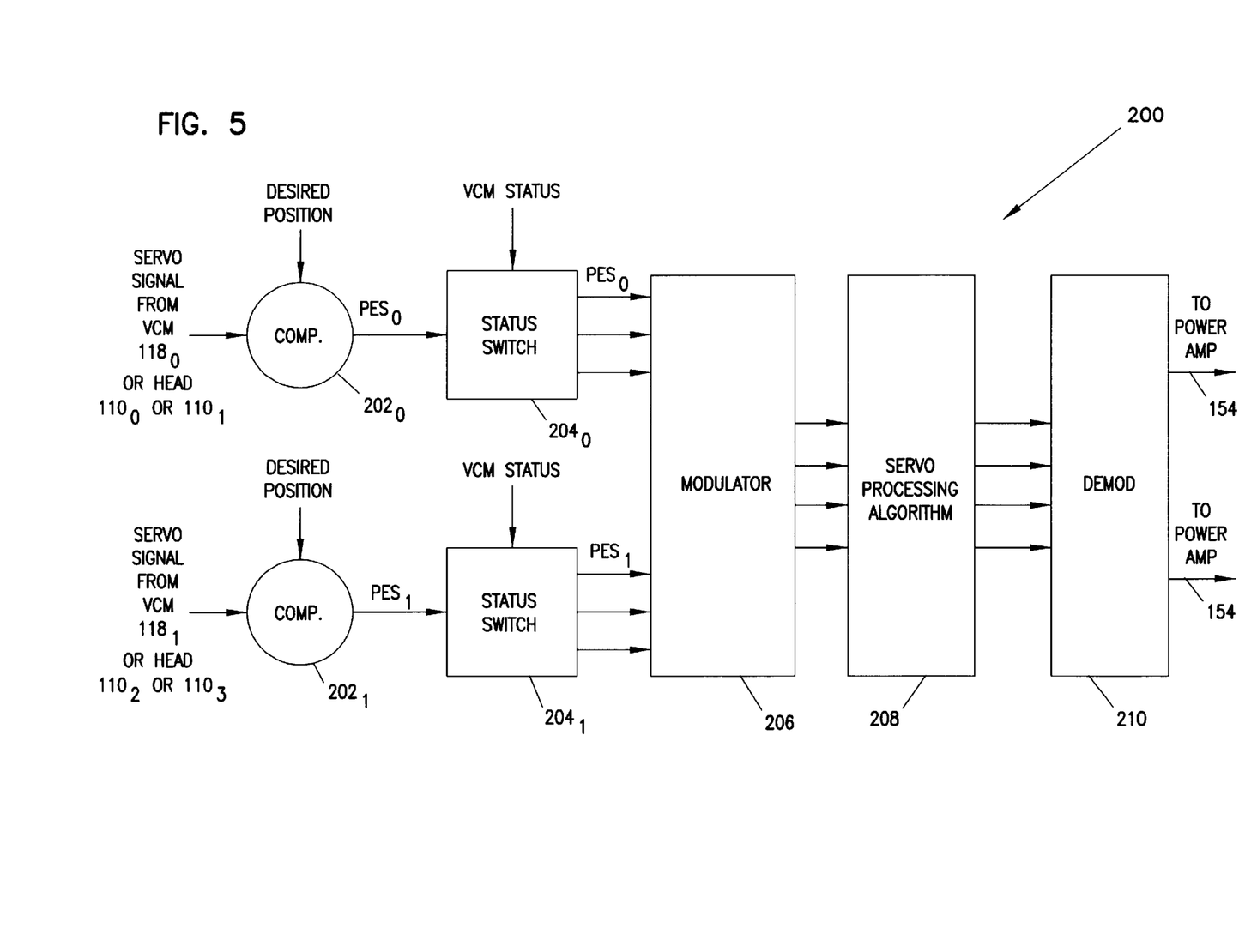
FIG. 5 is an electrical diagram, in block form, of data communications and drive control circuitry for a disc drive system according to a preferred embodiment of the invention.

FIG. 5 illustrates the construction of a digital servo processor 200 used to implement the VCM servo control 152 according to a preferred embodiment of the present invention. Comparator $202^0$ receives an input signal from microcontroller 146 corresponding to the desired position of head $110^0$ or $110^1$, whichever is currently being positioned for reading, writing or seeking. Comparator $202^0$ also receives a feedback signal from voice coil motor $118^0$ or from head $110^0$ or $110^1$, corresponding to the actual position of voice coil motor $118^0$ and heads $110^0$ and $110^1$. Based on the difference between the desired position signal and the actual position signal, comparator $202^0$ generates a position error signal $PES^0$. In a similar manner, comparator $202^1$ generates a position error signal $PES^1$ based on the difference between the desired position and the actual position of voice coil motor $118^1$ and heads $110^2$ and $110^3$.

Position error signal $PES^0$ is input to a status switch $204^0$. Status switch $204^0$ also receives a signal from microcontroller 146 indicating the present activity of voice coil motor $118^0$, i.e., whether voice coil motor $118^0$ is currently positioning E-block $117^0$ for reading, writing or seeking, or whether voice coil motor $118^0$ is currently idle. Depending on whether E-block $117^0$ is writing, reading or otherwise (seeking or idle, e.g.), the status switch $204^0$ outputs a position error signal $PES^0$ consisting of a predetermined number of bits. As discussed above, writing requires tight control of the head $110^0$, $110^1$ with respect to the corresponding track, while reading requires substantially less control, and seeking (or idle) requires even less control. Therefor, according to a preferred embodiment of the present invention, the position error signal put out by status switch $204^0$ will include a greater number of bits if the voice coil motor $118^0$ is positioning for writing than if the voice coil motor $118^0$ is positioning for reading. Likewise, the position error signal $PES^0$ put out by status switch $204^0$ will consist of a greater number of bits if the voice coil motor $118^0$ is positioning for reading than if the voice coil motor $118^0$ is seeking or idle. For the sake of illustration, the position error signal $PES^0$ might consist of 24 bits for writing, 16 bits for reading, and 8 bits for seeking or idle.

In a similar manner, status switch $204^1$ receives a position error signal $PES^1$ from comparator $202^1$ and puts out a position error signal $PES^1$ consisting of a predetermined number of bits according to the present activity of voice coil motor $118^1$. As above, for the sake of illustration, the position error signal $PES^1$ might consist of 24 bits for writing, 16 bits for reading, and 8 bits for seeking or idle.

The position error signal outputs $PES^0$ and $PES^1$ from the status switches $204^0$ and $204^1$ are sent to modulator 206. The modulator 206 combines the position error signals $PES^0$ and $PES^1$ into a combined position error signal consisting of a predetermined number of bits. In the illustrative embodiment wherein the drive 100 includes two voice coil motors $118^0$, $118^1$ and one read/write channel, the combined position error signal preferably includes a number of bits equal to the sum of the number of bits in a writing position error signal and the number of bits in a seeking or idle position error signal. A combined position error signal consisting of this number of bits is of sufficient size because in this embodiment of the invention, the drive 100 can only read or write with one head $110^0$–$110^3$ at a time. Thus, the state of the drive 100 which would require the maximum number of bits in the position error signal would be when one voice coil motor 118⁰, 118¹ is positioning an associated head for writing and the other voice coil motor 118 is either performing a seek or is idle. Using the illustrative position error signal sizes referred to above (24 bits for writing, 16 for reading and 8 for seeking or idle), the combined position error signal output from the modulator would be a 32-bit signal (24 bits for writing+8 bits for seeking or idle). It will be recognized by one of ordinary skill in the art that the illustrative examples of 8, 16, 24 and 32 bits are purely arbitrary and could be almost any combination of bits.

The combined position error signal from the modulator 206 is input to a servo processing algorithm 208, which generates a combined signal which is indicative of the magnitude, polarity and duration of the correction current required by the voice coil motors 118⁰, 118¹ to achieve the desired position of the heads 110⁰–110³. Demodulator 210 receives the combined correction current signal from the servo processing algorithm 208 and separates the signal into two independent correction current signals, one for each of the voice coil motors 118⁰, 118¹. The independent correction current signals are supplied to power amps 154⁰, 154¹, which then apply the desired current to the voice coil motors 118⁰, 118¹.

It will be appreciated that the systems and methods of the present invention effect servo control of multiple voice coil motors 118⁰, 118¹ using only one VCM servo control loop 152, preferably implemented with a single digital servo processor 200, whereas existing systems employing multiple voice coil motors for independently actuating multiple actuators or E-blocks require a separate VCM servo control loop for each voice coil motor. It will be further appreciated that the single digital servo processor 200 of the present invention need be of only slightly higher performance than would be required of each of the multiple servo controllers used in existing systems. Returning again to the illustrative example and illustrative numbers used above with respect to the position error signal PES (24 bits for writing, 16 bits for reading and 8 for seeking or idle), a system according to the present invention would require only one 32-bit digital servo processor 200.

To accomplish the same degree of control, existing systems would require two 24-bit processors because each processor would need to be able to accommodate the 24-bit position error signal PES required for controlling the associated voice coil motor during a read operation.

It will be still further appreciated that the systems and methods of the present invention require only one set of the look-up tables and state machines required to effect servo control of the voice coil motors 118⁰, 118¹, whereas existing systems employing multiple voice coil motors for independently actuating multiple actuators or E-blocks require a separate set of look-up tables and state machines for each VCM servo controller.

Thus, the present invention realizes reduced-cost control for disc drives having multiple voice coil motors for actuating multiple E-blocks or actuators, when compared to traditional methods.

While the above embodiments of the invention are described relative to two-disc systems, with four read/write heads 110⁰–110³, it is to be understood that the present invention may be utilized in connection with other arrangements of disc drives, including those having more than two discs therein.

Additionally, the present invention is applicable to disc drives 100 having any plural number of voice coil motors 118 and associated E-blocks 117 or actuator arms 114. The invention is also applicable to disc drives 100 having multiple read/write channels, thus enabling reading and/or writing with multiple heads 110 simultaneously. Thus, in an illustrative system similar to the one referred to above (using a 24-bit position error signal for writing, 16 bits for reading and 8 bits for seeking or idle), a system with a 64-bit processor could accommodate two read/write channels and four independently controlled E-blocks 117 or actuator arms 114. The state of such a drive that would require the most servo bandwidth would be when two voice coil motors 118 are simultaneously positioning an associated head 110 for writing. This would require 24+24=48 bits for controlling the two voice coil motors being used for writing and 8+8=16 bits for controlling the two seeking or idle voice coil motors, for a total of 64 servo control bits.

In summary, one embodiment of the present invention is directed to an actuator assembly 116 including a plurality of actuator arms 114⁰–114³, a plurality of read/write heads 110⁰–110³, a plurality of voice coil motors 118⁰, 118¹, and a single voice coil motor servo control circuit 152. Each of the actuator arms 114⁰–114³ are rotatable about a pivot axis 120 independently from another one of the actuator arms 114⁰–114³. The read/write heads 110⁰–110³ are each mounted at a distal end of one of the actuator arms 114⁰–114³ so as to be proximate a surface of a magnetic disc 106⁰, 106¹. Each of the voice coil motors 118⁰, 118¹ are coupled to at least one of the actuator arms 114⁰–114³ and adapted to controllably rotate its associated actuator arm (or arms) 114⁰–114³ about the pivot axis 120. The single voice coil motor servo control circuit 152 is adapted to control the plurality of voice coil motors 118⁰, 118¹.

In a preferred embodiment, the voice coil motor servo control circuit 152 comprises a single digital servo processor 200 that dynamically allocates servo bandwidth to the plurality of voice coil motors 118⁰, 118¹ according to the present activity of each voice coil motor 118⁰, 118¹.

Another embodiment of the present invention is directed to a disc drive 100 including a spindle 109, at least one magnetic disc 106⁰, 106¹, a spindle motor 150, a plurality of actuator arms 114⁰–114³, a plurality of read/write heads 110⁰–110³, a plurality of voice coil motors 118⁰, 118¹, and a single voice coil motor servo control circuit 152. The magnetic disc(s) 106⁰, 106¹, are adapted to store data and are rotatable about the spindle 109. The spindle motor 150 is adapted to rotate the magnetic disc(s) 106⁰, 106¹. Each of the actuator arms 114⁰–114³ are rotatable about a pivot axis 120 independently from another one of the actuator arms 114⁰–114³. The read/write heads 110⁰–110³ are each mounted at a distal end of one of the actuator arms 114⁰–114³ so as to be proximate a surface of a magnetic disc 106⁰, 106¹. Each of the voice coil motors 118⁰, 118¹ are coupled to at least one of the actuator arms 114⁰–114³ and adapted to controllably rotate its associated actuator arm (or arms) 114⁰–114³ about the pivot axis 120. The single voice coil motor servo control circuit 152 is adapted to control the plurality of voice coil motors 118⁰, 118¹.

Still another embodiment of the present invention is directed to a disc drive 100 including a plurality of voice coil motors 118⁰, 118¹, each coupled to at least one actuator arm 114⁰–114³ and each adapted to controllably rotate its associated actuator arm(s) 114⁰–114³, and a single digital servo processor 200 that dynamically allocates servo bandwidth to the plurality of voice coil motors 118⁰, 118¹ according to the present activity of each voice coil motor 118⁰, 118¹.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, each actuator arm may have more than one read/write head disposed thereon without departing from the scope and spirit of the present invention. Furthermore, it is contemplated that the various electronic circuitry for controlling the drive and data communication of the disc drive systems may be implemented according to a wide range of realizations. Other modifications can also be made.

What is claimed is:

1. An actuator assembly for a computer disc drive system having one or more magnetic discs adapted to store data, the actuator assembly comprising:
   a plurality of actuator arms, each rotatable about a pivot axis independently from another one of the plurality of actuator arms;
   a plurality of read/write heads, each mounted at a distal end of one of the actuator arms so as to be proximate a surface of one of the magnetic discs;
   a plurality of voice coil motors, each coupled to at least one of the actuator arms, each adapted to controllably rotate its associated at least one actuator arm about the pivot axis independently from another one of the plurality of voice coil motors; and
   a single servo control circuit adapted to control the plurality of voice coil motors, the servo control circuit adapted to dynamically allocate servo bandwidth to the plurality of voice coil motors according to a present activity of each voice coil motor.

2. The actuator assembly of claim 1 wherein the servo control circuit dynamically allocates to a given voice coil motor a first amount of servo bandwidth if said voice coil motor is presently positioning an associated read/write head for writing, a second amount of servo bandwidth, lesser than the first amount, if said voice coil motor is presently positioning an associated read/write head for reading, and a third amount of servo bandwidth, lesser than the first and second amounts, if said voice coil motor is presently seeking or idle.

3. The actuator assembly of claim 2 wherein the disc drive system includes only one read/write channel and two voice coil motors, and wherein the sum of the first amount of servo bandwidth and the third amount of servo bandwidth is equal to the total bandwidth of the servo control circuit.

4. The actuator assembly of claim 2 wherein the servo control circuit comprises:
   a plurality of comparators, one for each voice coil motor, each adapted to determine a position error signal for its associated voice coil motor based on the actual position of a read/write head associated with the voice coil motor and on the desired position of said read/write head;
   a plurality of status switches, one for each voice coil motor, adapted to express each position error signal with a number of bits dependent on the present activity of the corresponding voice coil motor; and
   a modulator adapted to combine the plurality of position error signals into a combined position error signal comprising a predetermined number of bits.

5. The actuator assembly of claim 4 wherein the servo control circuit further comprises:
   a servo processing algorithm adapted to generate a combined correction current signal based on the combined position error signal and indicative of the current required by the voice coil motors to achieve the desired position of the read/write heads; and
   a demodulator adapted to separate the combined correction current signal into a plurality of independent correction current signals, one for each of the plurality of voice coil motors.

6. A computer disc drive system comprising:
   a spindle;
   at least one magnetic disc adapted to store data and rotatable about the spindle;
   a spindle motor adapted to rotate the at least one magnetic disc;
   a plurality of actuator arms, each rotatable about a pivot axis independently from another one of the plurality of actuator arms;
   a plurality of read/write heads, each mounted at a distal end of one of the actuator arms so as to be proximate a surface of one of the magnetic discs;
   a plurality of voice coil motors, each attached to at least one of the actuator arms, each adapted to controllably rotate its associated at least one actuator arm about the pivot independently from another one of the plurality of voice coil motors; and
   a single servo control circuit adapted to control the plurality of voice coil motors, the servo control circuit adapted to dynamically allocate servo bandwidth to the plurality of voice coil motors according to a present activity of each voice coil motor.

7. The computer disc drive system of claim 6 wherein the single servo control circuit dynamically allocates to a given voice coil motor a first amount of servo bandwidth if said voice coil motor is presently positioning an associated read/write head for writing, a second amount of servo bandwidth, lesser than the first amount, if said voice coil motor is presently positioning an associated read/write head for reading, and a third amount of servo bandwidth, lesser than the first and second amounts, if said voice coil motor is presently seeking or idle.

8. The computer disc drive system of claim 7 wherein the disc drive system includes only one read/write channel and two voice coil motors, and wherein the sum of the first amount of servo bandwidth and the third amount of servo bandwidth is equal to the total bandwidth of the single servo control circuit.

9. The computer disc drive system of claim 7 wherein the single servo control circuit comprises:
   a plurality of comparators, one for each voice coil motor, each adapted to determine a position error signal for its associated voice coil motor based on the actual position of a read/write head associated with the voice coil motor and on the desired position of said read/write head;
   a plurality of status switches, one for each voice coil motor, adapted to express each position error signal with a number of bits dependent on the present activity of the corresponding voice coil motor; and
   a modulator adapted to combine the plurality of position error signals into a combined position error signal comprising a predetermined number of bits.

10. The computer disc drive system of claim 9 wherein the single servo control circuit further comprises:
   a servo processing algorithm adapted to generate a combined correction current signal based on the combined position error signal and indicative of the current required by the voice coil motors to achieve the desired position of the read/write heads; and a demodulator adapted to separate the combined correction current signal into a plurality of independent correction current signals, one for each of the plurality of voice coil motors.

11. A method of providing servo control for a plurality of voice coil motors in a computer disc drive system, each voice coil motor adapted for independently positioning at least one read/write head relative to a disc surface, the method comprising:

(a) controlling the plurality of voice coil motors with a single digital servo processor; and (b) dynamically allocating servo bandwidth to the plurality of voice coil motors according to a present activity of each voice coil motor.

12. The method of claim 11 wherein the dynamically allocating step (a) comprises:

dynamically allocating a first amount of servo bandwidth to a given voice coil motor if said voice coil motor is presently positioning an associated read/write head for writing;

dynamically allocating a second amount of servo bandwidth, lesser than the first amount, to a given voice coil motor if said voice coil motor is presently positioning an associated read/write head for reading; and dynamically allocating a third amount of servo bandwidth, lesser than the first and second amounts, to a given voice coil motor if said voice coil motor is presently seeking or idle.

13. The method of claim 12 wherein the disc drive system includes only one read/write channel and two voice coil motors, and wherein the sum of the first amount of servo bandwidth and the third amount of servo bandwidth is equal to the total bandwidth of the single digital servo processor.

14. The method of claim 11 wherein the dynamically allocating step (a) comprises:

determining a plurality of position error signals, one for each of the plurality of voice coil motors, by comparing the actual position of a read/write head associated with the corresponding voice coil motor with the desired position of said read/write head;

expressing each position error signal with a number of bits dependent on a present activity of the corresponding voice coil motor; and combining the plurality of position error signals into a combined position error signal consisting of a predetermined number of bits.

15. The method of claim 14 wherein the controlling step (a) comprises:

generating a combined correction current signal based on the combined position error signal and indicative of the current required by the voice coil motors to achieve the desired position of the read/write heads;

separating the combined correction current signal into a plurality of independent correction current signals, one for each of the plurality of voice coil motors; and applying a correction current to each of the plurality of voice coil motors based on the independent correction current signals.

16. An actuator assembly in a computer disc drive comprising:

a plurality of voice coil motors, each coupled to at least one actuator arm, each adapted to controllably rotate its associated at least one actuator arm independently from another one of the plurality of voice coil motors;

a single servo control circuit adapted to control the plurality of voice coil motors; and means for allocating servo bandwidth to the plurality of voice coil motors according to a present activity of each voice coil motor.

* * * * *